(12) United States Patent
Naganuma

(10) Patent No.: US 6,829,403 B2
(45) Date of Patent: Dec. 7, 2004

(54) OPTICAL SWITCH HAVING AN ARRAY OF OPTICAL FIBERS WITH RESPECTIVE, REMOVABLE DISPOSED MIRRORS AND A LENS DISPOSED AWAY FROM AN END SURFACE OF EACH CORRESPONDING OPTICAL FIBER

(75) Inventor: Norihisa Naganuma, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 10/290,501

(22) Filed: Nov. 8, 2002

(65) Prior Publication Data

US 2003/0174933 A1 Sep. 18, 2003

(30) Foreign Application Priority Data

Mar. 15, 2002 (JP) ........................................ 2002-071164

(51) Int. Cl.[7] ................................................. G02B 6/35
(52) U.S. Cl. ............................. 385/18; 385/16; 385/22
(58) Field of Search ............................... 385/18, 22, 16

(56) References Cited

U.S. PATENT DOCUMENTS

2003/0099430 A1 * 5/2003 Li et al. ........................ 385/18

FOREIGN PATENT DOCUMENTS

| JP | 55-159402 | 12/1980 |
|----|-----------|---------|
| JP | 2001-75026 | 3/2001 |

* cited by examiner

Primary Examiner—John D. Lee
Assistant Examiner—Eric Wong
(74) Attorney, Agent, or Firm—Staas & Halsey LLP

(57) ABSTRACT

An optical switch includes a plurality of optical fibers arrayed at equal intervals and in parallel, each optical fiber having a central axis and having an end surface on one side of the optical switch. A single lens has a focal length and a central axis parallel to each fiber central axis, the lens disposed away from the fiber end surface at a distance corresponding to the focal length of the lens. A first mirror has a reflection surface perpendicular to the lens central axis, the first mirror removably disposed at a first position on the other side of the optical switch. A second mirror has a reflection surface inclined from the lens central axis, the second mirror removably disposed at the first position. One of the first and second mirrors is selectively disposed at the first position.

10 Claims, 12 Drawing Sheets

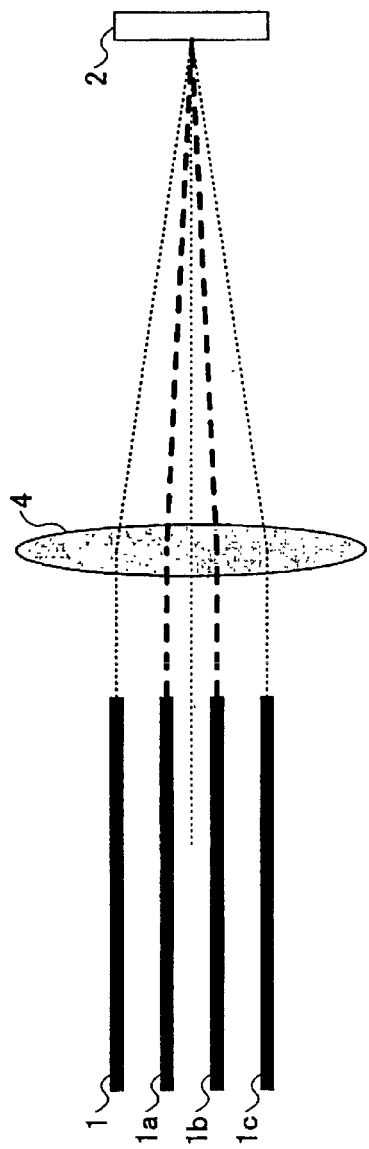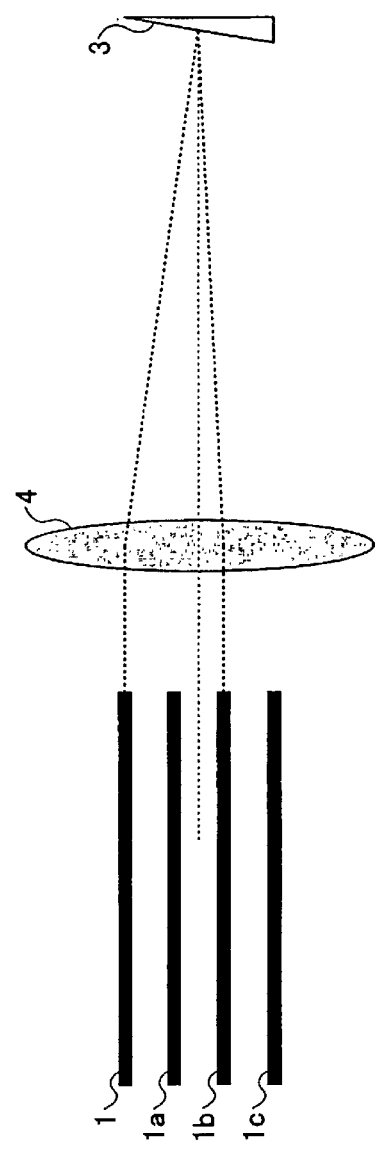

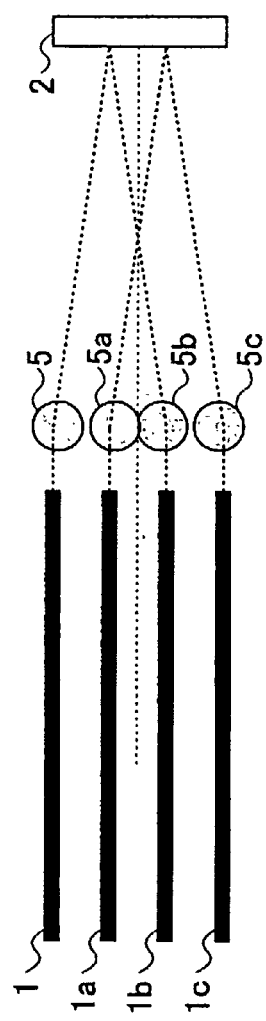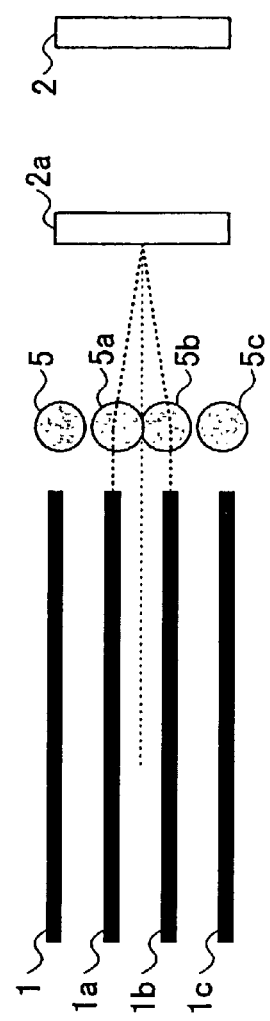

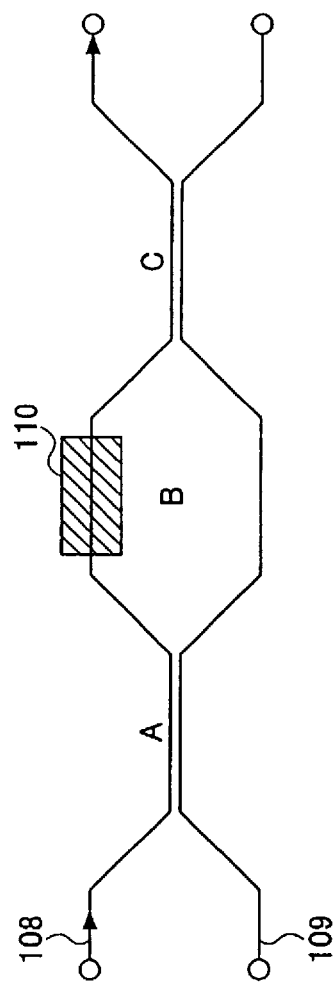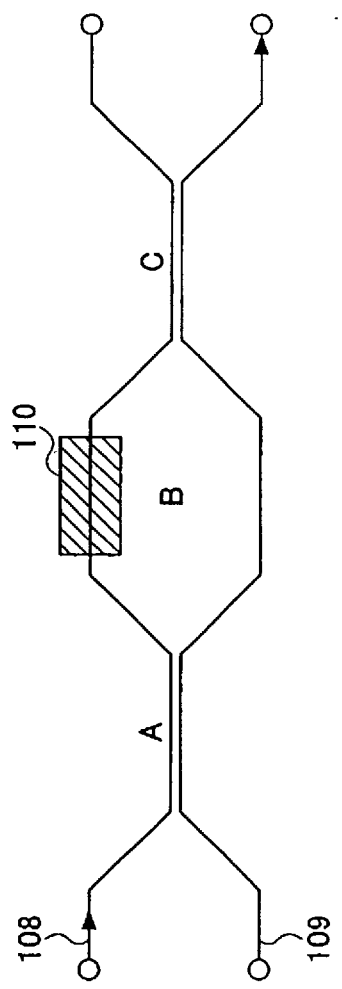

US 6,829,403 B2

OPTICAL SWITCH HAVING AN ARRAY OF OPTICAL FIBERS WITH RESPECTIVE, REMOVABLE DISPOSED MIRRORS AND A LENS DISPOSED AWAY FROM AN END SURFACE OF EACH CORRESPONDING OPTICAL FIBER

BACKGROUND OF THE INVENTION

1. Field of the Invention

The present invention relates to an optical switch which switches the transmission path of an optical signal on the optical fiber in an optical communication system.

2. Description of the Related Art

The optical communication system is used as a trunk-line network system among the current digital network systems. With the recent developments of the optical communication system, the improvement of the propagation loss of the optical fibers, the improvement in the transmission speed of the laser diodes which transform an electrical signal into an optical signal, and the utilization and performance improvement of the erbium-doped fiber amplifier as a type of optical-fiber amplifier.

Moreover, because the multi-media communications are widely spread, the need for the increase in data-transmission capacity and the rapid spread of the Internet, the wavelength-multiplexing optical-communication system which carries out wavelength multiplexing of two or more optical signals with different wavelengths from different information sources and transmits the multiplexed signal on a single optical fiber is used widely, and the degree of the multiplexing is steadily increasing for higher density.

In order to keep the influence of the cut-off failure of the optical fibers between the communication nodes to the minimum or to recover the communication promptly from the failure of the optical fiber, in the optical communication system which carries out the wavelength multiplexing with high density and transmits the high-capacity information signal on the optical fibers, the route changing function is usually assigned to each communication node.

At each communication node, the role of the wavelength add-drop multiplexer to carry out the functions of assigning an input wavelength and multiplexing this signal to be routed over the network is becoming important.

In order to carry out the above-mentioned functions, a 1×2 optical switch which couples one input optical signal with one of two output optical fibers, and a 2×2 optical switch which couples two input optical signals with two output optical fibers respectively, or couples one input optical signal with one of the two output optical fibers are provided.

Especially, in a high-density wavelength-multiplex optical communication system, the number of the optical switches that must be provided in the system is increasing in proportion to the wavelength multiplexing number that is demanded for the optical communication network. Accordingly, there is the demand for a small-size, high-performance optical switch which is suited for high-density assembly on the high-density wavelength-multiplex optical communication system.

FIG. 9A and FIG. 9B show how the optical switch is used in the add-drop equipment.

In FIG. 9A and FIG. 9B, reference numeral 101 is the optical demultiplexer which demultiplexes the wavelength-multiplexed optical signal into the optical signals of individual wavelengths. Reference numeral 102 is a 2×2 optical switch which is coupled to the optical demultiplexer 101, reference numeral 103 is an optical attenuator which can adjust attenuation of the output of the 2×2 optical switch 102, and reference numeral 104 is the optical multiplexer which carries out the wavelength multiplexing of the optical signals of the individual wavelengths from the individual switches.

In the example of FIG. 9A, the through connection is performed for the optical signal of a specific wavelength in the add-drop equipment. For example, in the through connection, the optical signal inputted to the input terminal #1 of the optical switch 102 is outputted to the output terminal #3 of the optical switch 102.

In the example of FIG. 9B, the add-drop connection is performed in order to incorporate the information of the optical signal of a specific wavelength and to send out the information which is different from the incorporated one using the optical signal of the same wavelength. For example, in this add-drop connection, the optical signal inputted to the input terminal #1 of the optical switch 102 is outputted to the output terminal #4 of the optical switch 102, while the optical signal inputted to the input terminal #2 of the optical switch 102 is outputted to the output terminal #3 of the optical switch 102.

That is, in order to realize the add-drop function, the 2×2 optical switch is needed. Although only one 2×2 optical switch which carries out the add-drop function for the optical signal of a single wavelength is shown in FIG. 9A and FIG. 9B, a number of 2×2 optical switches, which is equal to the wavelength multiplex number are required. Therefore, the high-density assembly characteristics are needed for the optical switches.

FIG. 10A and FIG. 10B show an optical switching circuit using a movable prism.

In FIG. 10A and FIG. 10B, reference numeral 105 is the movable prism, and reference numerals 106 and 107 are the two collimated light beams.

In the case of FIG. 10A, the prism 105 does not go into the paths of the collimated light beams as indicated by the dotted line. In this case, the collimated light beams 106 and 107 are not refracted, and they go straight through the optical switching circuit.

In the case of FIG. 10B, the prism 105 is moved to go into the paths of the collimated light beams. In this case, on the incoming plane and the outgoing plane of the prism 105, each of the collimated light beams 106 and 107 is refracted twice. Consequently, the collimated light beams 106 and 107 cross each other in the middle of the prism 105, and they are outputted from the prism 105.

FIG. 11A and FIG. 11B show a changeover switch using an optical waveguide.

In FIG. 11A and FIG. 11B, reference numeral 108 is the first core of the optical waveguide, reference numeral 109 is the second core of the optical waveguide, and reference numeral 110 is the electrode which is used to apply a predetermined voltage to the first core 108.

The first and second cores 108 and 109 are used to form the following optical circuit. That is, at the portions A and C, the distance between the cores 108 and 109 is narrowed so that the directional couplers are formed there which interact the electric fields of the optical signals which are delivered on the both cores. The directional coupler at the portion A is designed such that the optical signal incident to the first core 108 is divided into two equal optical signals at the outputs of the directional coupler and the two equal optical signals are delivered on the first and second cores 108 and 109.

Moreover, the directional coupler at the portion C is designed such that when the optical signals having the same phase from the first and second cores 108 and 109 are incident to the inputs of the directional coupler, both the optical signals are outputted to the side of the first core 108 as shown in FIG. 11A, and when the optical signals having the phase difference π from the first and second cores 108 and 109 are incident to the inputs of the directional coupler, both the optical signals are outputted to the side of the second core 109 as shown in FIG. 11B.

On the other hand, in the portion of B, the distance between the cores 108 and 109 is enlarged so as not to interact each other and the electrode 110 is provided to apply a predetermined voltage to the first core 108 only. The known Mach-Zehnder interferometer is thus formed.

In the Mach-Zehnder interferometer, the index of refraction for the optical signal which is delivered on the first core 108 is varied with the voltage applied to the electrode 110, and the phase difference is created over the optical signals having the same phase which are inputted to the first and second cores 108 and 109. In the present case, it is assumed that the phase difference is set to 0 when the voltage is not applied to the electrode 110, and the phase difference is set to π when the voltage is applied to the electrode 110.

When the voltage is not applied to the electrode 110, the optical signal inputted to the first core 108 is outputted from the side of the first core 108 as shown in FIG. 11A. On the other hand, when the voltage is applied to the electrode 110, the optical signal inputted to the first core 108 is outputted from the side of the second core 109 as shown in FIG. 11B. Therefore, the changeover switch function can be realized.

In the above-mentioned example, the Mach-Zehnder interferometer is used and the electro-optical effect thereof is utilized to create the phase difference by using the applied voltage. Alternatively, the Mach-Zehnder interferometer may be used in which the thermo-optical effect is utilized to create the phase difference by using the heat source film on one of the first and second cores and controlling the temperature of the heat source film.

Accordingly, by using the optical switch shown in FIG. 10 A–FIG. 11B, the through connection and the add-drop connection are carried out.

In the above example, although the actual structure of the optical switch is not shown in FIG. 10A through FIG. 11B, if the input port is arranged on one side of the optical switch, the output port has to be arranged on the other side of the optical switch as is apparent from FIG. 10A through FIG. 11B.

However, in the conventional optical-communication equipment, such as the add-drop equipment, the input port and the output port are configured in many cases on the same side of the equipment. Taking into consideration the configuration of the conventional optical communication equipment, the adaptation of the optical switch of the type shown in FIG. 10A through FIG. 11B must be considered. In order to arrange the input port and the output port on the same side of the equipment, it is necessary that the bending of the optical fibers on the both sides of the optical switch be performed through the forming process.

When the optical fibers are bent through the forming process, it is impossible to make the radius of curvature of the bending to a radius below a predetermined value due to the physical properties of the optical fibers.

If the optical fibers on the both sides of the optical switch are bent through the forming process in order to arrange the input port and the output port on the same side of the equipment, the problem will arise in that the mounting space and the space required for the forming process become excessively large.

As for the wavelength-multiplex optical communication system the wavelength multiplex number of which is steadily increasing, it is necessary to take into consideration the above-mentioned problem.

SUMMARY OF THE INVENTION

An object of the present invention is to provide an improved optical switch in which the above-described problems are eliminated.

Another object of the present invention is to provide an optical switch that can be configured to arrange both the input and output optical fibers on a single side of the optical switch in order to enable high-density assembly.

The above-mentioned objects of the present invention are achieved by an optical switch comprising: a plurality of optical fibers, including input fibers and output fibers, arrayed at equal intervals and in parallel, each of the plurality of optical fibers having a central axis and having an end surface on one side of the optical switch; a single lens having a focal length and a central axis, the central axis of the lens being parallel to the central axis of each optical fiber, the lens disposed away from the end surface of each optical fiber at a distance corresponding to the focal length of the lens; a first mirror having a first reflection surface perpendicular to the central axis of the lens, the first mirror removably disposed at a first position on the other side of the optical switch; and a second mirror having a second reflection surface inclined from the central axis of the lens, the second mirror removably disposed at the first position, wherein the first and second mirrors are configured such that one of the first and second mirrors is selectively disposed at the first position.

The above-mentioned objects of the present invention are achieved by an optical switch comprising: a plurality of optical fibers, including input fibers and output fibers, arrayed in parallel, each of the plurality of optical fibers having a central axis and having an end surface on one side of the optical switch; a plurality of lenses, each having a focal length and a central axis, respectively provided for the plurality of optical fibers, the central axis of each lens being arranged in parallel to and shifted by a predetermined distance from the central axis of each optical fiber, each lens disposed away from the end surface of a corresponding one of the plurality of optical fibers at a distance corresponding to the focal length of the lens; and a plurality of mirrors each having a reflection surface perpendicular to a central axis between one of the input fibers and one of the output fibers, each of the plurality of mirrors, excluding a mirror located on a far-end side of the optical switch in a propagation direction of light, being removably disposed at a crossing-point position corresponding to a position where an optical axis of a light beam from one of the input fibers and an optical axis of a light beam to one of the output fibers cross each other, wherein the plurality of mirrors are configured such that one of the plurality of mirrors is selectively disposed at the crossing-point position.

According to the first aspect of the present invention, when the first mirror is disposed at the position corresponding to the crossing point of the central axis of the lens and the optical axis of the light beam derived by the lens, the optical switch of the present invention serves to couple the light beams sent from the input fibers among the plurality of optical fibers, with the output fibers that are symmetrical to the input fibers with respect to the central axis of the lens. When the second mirror with the inclined reflection surface is disposed at the same position, the optical switch of the present invention serves to couple one of the light beams sent from one of the input fibers with one of the output fibers that is unsymmetrical to that input fiber with respect to the central axis of the lens. Moreover, all the plurality of optical fibers including the input and output fibers are arranged on a single side of the optical switch, and it is possible to provide a small-size optical communication equipment by using the optical switch of the present invention.

According to the second aspect of the present invention, when the first mirror is disposed at the first position corresponding to the crossing point of the optical axis of the outgoing light beam and the optical axis of the incoming light beam, the optical switch of the present invention serves to couple the light beams sent from the input fibers among the plurality of optical fibers, with the output fibers that are symmetrical to the input fibers with respect to the central axis of the lens. When the second mirror is disposed at the second position corresponding to the crossing point of the central axis of the lens array and the optical axis of the incoming light beam, the optical switch of the present invention serves to couple one of the light beams sent from one of the input fibers with one of the output fibers that is unsymmetrical to that input fiber with respect to the central axis of the lens. Moreover, all the plurality of optical fibers are arranged on the single side of the optical switch, and it is possible to provide a small-size optical communication equipment by using the optical switch of the present invention.

BRIEF DESCRIPTION OF THE DRAWINGS

Other objects, features and advantages of the present invention will become apparent from the following detailed description when read in conjunction with the accompanying drawings.

FIG. 1A and FIG. 1B are diagrams for explaining the first aspect of the present invention.

FIG. 2A and FIG. 2B are diagrams for explaining the second aspect of the present invention.

FIG. 11A and FIG. 11B are diagrams of a changeover switch using an optical waveguide.

DETAILED DESCRIPTION OF PREFERRED EMBODIMENTS

Figure 3A:
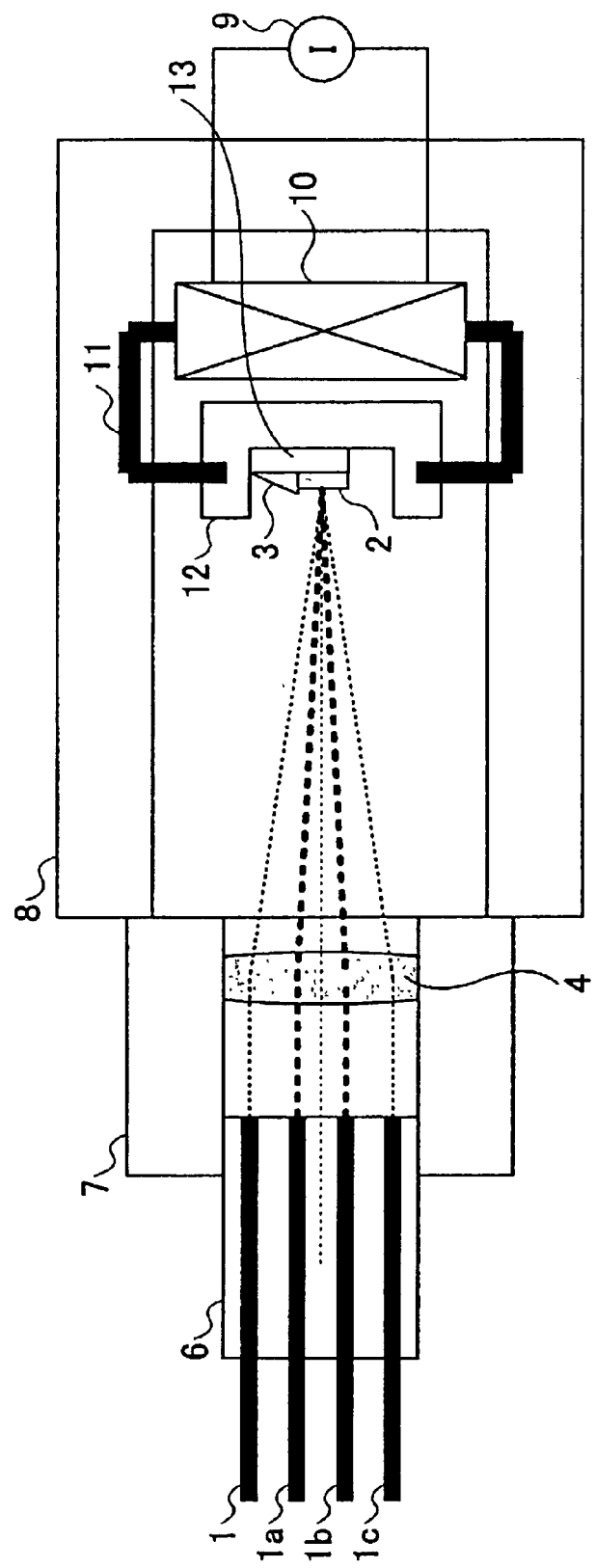
FIG. 3A and FIG. 3B are diagrams of the optical switch according to the first preferred embodiment of the present invention.

A description will now be given of preferred embodiments of the present invention with reference to the accompanying drawings.

FIG. 1A and FIG. 1B are diagrams for explaining the first aspect of the present invention.

In the composition of FIG. 1A, the optical switch of the present invention having the composition of 2 inputs by 2 outputs is provided. The optical fibers 1, 1a, 1b and 1c include the input fibers 1 and 1a and the output fibers 1b and 1c. In the optical switch, the optical fibers 1, 1a, 1b and 1c are arranged at equal intervals and in parallel to the central axis of the lens 4. The mirror 2 reflects the incoming light beams from the input fibers 1 and 1a toward the output fibers 1c and 1b. The lens 4 converges the incoming light beams from the input fibers 1 and 1a onto the reflection surface of the mirror 2, and couples the light beams reflected by the mirror 2 with the output fibers 1c and 1b so that the outgoing light beams are delivered on the output fibers 1c and 1b.

Specifically, the respective components of the optical switch are arranged so as to satisfy the following positional relationship.

The optical fibers 1, 1a, 1b and 1c are arranged at equal intervals and in parallel to the central axis of the lens 4, and the distance between the lens 4 and the end surface of each of the optical fibers 1, 1a, 1b and 1c is set to be equal to the focal length of the lens 4.

The mirror 2 is arranged so that the reflection surface of the mirror 2 is perpendicular to the central axis of the lens 4. The reflection surface of the mirror 2 is removably disposed at the position corresponding to the crossing point of the central axis of the lens 4 and the optical axis of the light beam of one of the input fibers 1 and 1a derived by the lens 4.

What is necessary is to set the distance between the central axis of one optical fiber and the central axis of the lens 4 to "d", and set the distance between the lens 4 and the mirror 2 to "d/tan θ" along the optical path when the angle of the optical axis of the refracted light beam from the lens 4 to the central line of the lens 4 is set to "θ".

As the optical switch is configured so as to satisfy the above relationship, the lens 4 in the composition of FIG. 1A converges the incoming light beams from the input fibers 1 and 1a onto the reflection surface of the mirror 2 according to the refracting operation of the lens 4. Moreover, the lens 4 couples the light beams reflected by the mirror 2 with the output fibers 1c and 1b so that the outgoing light beams from the lens 4 are incident to the end surfaces of the output fibers 1c and 1b and delivered on the output fibers 1c and 1b in the opposite direction.

Specifically, in the composition of FIG. 1A, the incoming light beam from the optical fiber 1 is incident to the end surface of the optical fiber 1c and delivered on the optical fiber 1c in the opposite direction, while the incoming light beam from the optical fiber 1a is incident to the end surface of the optical fiber 1b and delivered on the optical fiber 1b in the opposite direction.

In the composition of FIG. 1B, the optical switch of the present invention having the composition of 1 input by 1 output is provided. The optical fibers 1, 1a, 1b and 1c are arranged at equal intervals and in parallel to the central axis of the lens 4. The mirror 3 with the inclined reflection surface reflects the incoming light beam from the input fiber 1 toward the output fiber 1b. The lens 4 converges the incoming light beam from the input fiber 1 onto the reflection surface of the mirror 3, and couples the light beam, reflected by the mirror 3, with the output fiber 1b so that the outgoing light beam is delivered on the output fiber 1b.

Specifically, the respective components of the optical switch are arranged so as to satisfy the following positional relationship.

The optical fibers 1, 1a, 1b and 1c are arranged at equal intervals and in parallel to the central axis of the lens 4, and the distance between the lens 4 and the end surface of each of the optical fibers 1, 1a, 1b and 1c is set to be equal to the focal length of the lens 4.

The mirror 3 is arranged so that the reflection surface of the mirror 3 is inclined at a predetermined angle to the central axis of the lens 4. The inclined reflection surface of the mirror 3 is removably disposed at the position corresponding to the crossing point of the central axis of the lens 4 and the optical axis of the light beam of one of the input fibers 1 and 1a derived by the lens 4.

What is necessary is to set the distance between the central axis of one optical fiber and the central axis of the lens 4 to "d", and set the distance between the lens 4 and the mirror 3 to "d/tan θ" along the optical path when the angle of the optical axis of the refracted light beam from the lens 4 to the central line of the lens 4 is set to "θ".

As the optical switch is configured so as to satisfy the above relationship, the lens 4 in the composition of FIG. 1B converges the incoming light beam from the input fiber 1 onto the inclined reflection surface of the mirror 3 by the refracting action of the lens 4. Moreover, the lens 4 couples the light beam reflected by the mirror 3, with the output fiber 1b so that the outgoing light beam sent from the lens 4 is incident to the end surface of the output fiber 1b and delivered on the output fiber 1b in the opposite direction.

In the composition of FIG. 1B, the inclination angle of the reflection surface of the mirror 3 from the central axis of the lens 4 is determined as follows.

Suppose that the distance between the central axis of the lens 4 and the optical fiber 1 is represented by "di", the distance between the central axis of the lens 4 and the optical fiber 1b is represented by "do", and the focal length of the lens 4 is represented by "f". The angle of the optical axis of the light beam of the input fiber 1 derived from the lens 4, to the central axis of the lens 4 is "$\tan^{-1}$ (di/f)". The angle of the optical axis of the light beam coupled to the output fiber 1b, to the central axis of the lens 4 is "$\tan^{-1}$ (do/f)".

In the present example, it is assumed that the incoming light beam is reflected and turned into the outgoing light beam by the mirror 3, and the incident angle of the incoming light beam is equal to the angle of reflection of the outgoing light beam on the reflection surface of the mirror 3. For this reason, according to the basic principles of the geometrical optics, the reflection surface of the mirror 3 is shifted from 90 degrees only one half of the difference between the angle of the optical axis of the incoming light beam to the central axis of the lens 4 and the angle of the optical axis of the outgoing light beam to the central axis of the lens 4.

Accordingly, the inclination angle of the reflection surface of the mirror 3 from the central axis of the lens 4 is determined as being equal to [90 degrees+{$\tan^{-1}$(di/f)−$\tan^{-1}$(do/f)}/2].

As described above, the optical switch is configured as shown in FIG. 1A and FIG. 1B. When the reflection surface of the mirror 2 is disposed at the position corresponding to the crossing point of the central axis of the lens 4 and the optical axis of the light beam of one of the input fibers 1 and 1a as in the composition of FIG. 1A, the lens 4 converges the incoming light beams from the input fibers 1 and 1a onto the reflection surface of the mirror 2, and couples the light beams reflected by the mirror 2 with the output fibers 1c and 1b so that the outgoing light beams from the lens 4 are incident to the end surfaces of the output fibers 1c and 1b and delivered on the output fibers 1c and 1b in the opposite direction.

On the other hand, when the inclined reflection surface of the mirror 3 is disposed instead of the mirror 2 at the same position as in the composition of FIG. 1B, the lens 4 converges the incoming light beam from the input fiber 1 onto the inclined reflection surface of the mirror 3, and couples the light beam reflected by the mirror 3, with the output fiber 1b so that the light beam from the lens 4 is incident to the end surface of the output fiber 1b and delivered on the output fiber 1b in the opposite direction. The composition of FIG. 1B provides the 1×1 optical switch, and the combination of the input port and the output port can be changed from that in the case of the 2×2 optical switch.

Figure 9A:
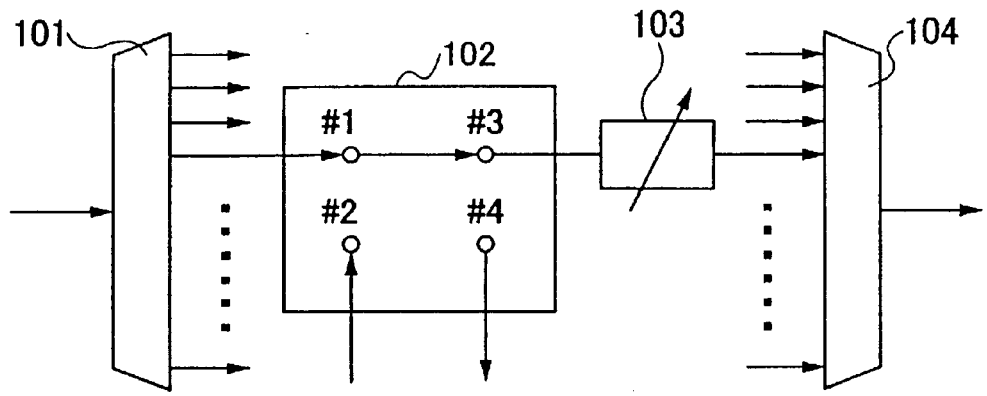
FIG. 9A and FIG. 9B are diagrams for explaining how the optical switch is used in the add-drop equipment.
Figure 9B:
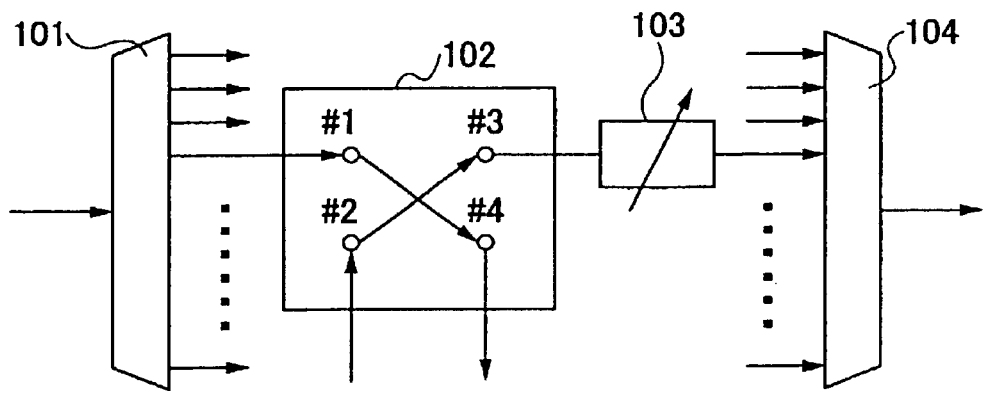
Figure 10A:
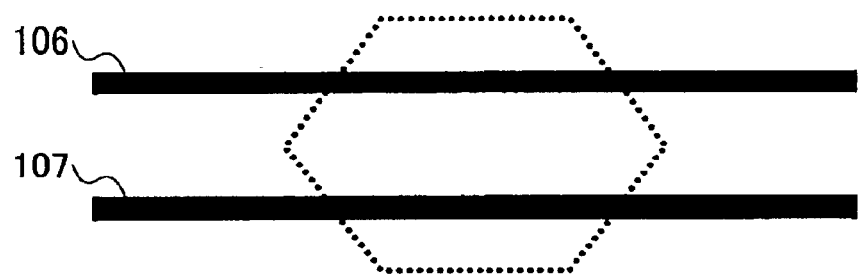
FIG. 10A and FIG. 10B are diagrams of an optical switching circuit using a movable prism.
Figure 10B:
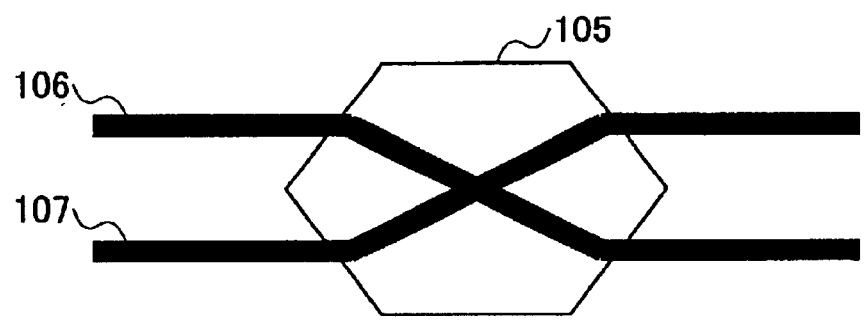

The composition of the optical switch in FIG. 1A may be applied to the optical switch in the add-drop equipment in FIG. 9B. As shown in FIG. 1A, the input optical signal is given to the optical fiber 1 and the output optical signal is taken out from the optical fiber 1c, while the input optical signal is given to the optical fiber 1a and the output optical signal is taken out from the optical fiber 1b. This corresponds to the composition of FIG. 9B in which the input optical signal is supplied to the terminal #1 of the optical switch 102 and the output optical signal is taken out from the terminal #4 of the optical switch 102, while the input optical signal is supplied to the terminal #2 of the optical switch 102 and the output optical signal is taken out from the terminal #3 of the optical switch 102. Namely, the composition of FIG. 1A provides the add-drop connection.

The composition of the optical switch in FIG. 1B may be applied to the optical switch in the add-drop equipment in FIG. 9A. As shown in FIG. 1B, the input optical signal is given to the optical fiber 1 and the output optical signal is taken out from the optical fiber 1b. This corresponds to the composition of FIG. 9A in which the input optical signal is supplied to the terminal #1 of the optical switch 102 and the output optical signal is taken out from the terminal #3 of the optical switch 102. Namely, the composition of FIG. 1B provides the through connection.

By switching between the composition of FIG. 1B and the composition of FIG. 1A, it is possible to attain the 2×2 optical switch required for the add-drop equipment.

According to the optical switch of FIG. 1A and FIG. 1B, all the optical fibers are arranged on a single side of the optical switch. Therefore, the optical switch of the present embodiment is suitable for high-density assembly, and it is possible to provide small-size optical communication equipment by using the optical switch of the present, invention.

FIG. 2A and FIG. 2B are diagrams for explaining the second aspect of the present invention.

In the embodiment of FIG. 2A, the optical switch having the composition of 2 inputs by 2 outputs based on the second aspect of the present invention is provided. The optical fibers 1, 1a, 1b and 1c include the input fibers 1 and 1a and the output fibers 1b and 1c. In the optical switch, the optical fibers 1, 1a, 1b and 1c are arranged at equal intervals and in parallel to the central axis of the lens array.

The mirror 2, which is always disposed at the position, reflects the incoming light beams from the input fibers 1 and 1a toward the output fibers 1b and 1c. The lenses 5, 5a, 5b and 5c are respectively provided for the optical fibers 1, 1a, 1b and 1c. The mirror 2a, which is disposed at the intermediate position only in the composition of FIG. 2B, reflects the incoming light beam from the input fiber 1a toward the output fiber 1b. The plurality of lenses 5, 5a, 5b and 5c are constituted by the lens array.

In the 2×2 composition of FIG. 2A, the mirror 2a is removed from the optical axes of the optical signals derived by the lenses 5 and 5a so as to avoid the interference of the mirror 2a with the optical axes of the optical signals. In the 1×1 composition of FIG. 2B, the mirror 2a is disposed at the intermediate position so that the optical axis of the light beam refracted by the lens 5a may be interrupted by the mirror 2a.

When the optical switch is set in the composition of FIG. 2A, the mirror 2a is removed from the optical axes of the input and output optical signals. When the optical switch is set in the composition of FIG. 2B, the mirror 2a is disposed at the intermediate position where the optical axis of the light beam from the input fiber 1a and the optical axis of the light beam to the output fiber 1b cross each other.

Specifically, in the present embodiment, the respective components of the optical switch are arranged so as to satisfy the following positional relationship.

The optical fibers 1, 1a, 1b and 1c are arranged at equal intervals and in parallel to the central axis of the lens array, and the distance between the lens arrays and the end surface of each of the optical fibers 1, 1a, 1b and 1c is set to the focal length of the lens array.

The central axis of the optical fiber 1 is arranged in parallel with the central axis of the lens 5, and shifted by a predetermined distance d from the central axis of the lens 5. Similarly, the central axis of optical fiber 1a is arranged in parallel to the central axis of lens 5a, and shifted by the predetermined distance d from the central axis of the lens 5a. The central axis of the optical fiber 1b is arranged in parallel to the central axis of the lens 5b, and shifted by the predetermined distance d from the central axis of the lens 5b. The central axis of the optical fiber 1c is arranged in parallel to the central axis of the lens 5c, and shifted by the predetermined distance d from the central axis of the lens 5c.

For the group of the symmetrical optical fiber and the lens, the shifting of the predetermined distance d is made in the opposite directions with respect to the central line of the four optical fibers. That is, the central axis of the lens 5 is shifted downward to the central axis of the optical fiber 1. The central axis of lens 5a is shifted downward to the central axis of optical-fiber 1a. On the other hand, the central axis of lens 5b is shifted upward to the central axis of the optical-fiber 1b. The central axis of lens 5c is shifted upward to the central axis of the optical-fiber 1c.

As described above, by shifting and configuring the central axis of each optical fiber and the central axis of each lens, the light beam is inputted from the optical fiber used as the input port, and the outgoing light beam from the lens becomes the collimated light beam.

Moreover, at right angles to the central line of the four optical fibers, the mirror 2 is disposed at the position where the input light beam from the optical fiber 1 is reflected by the mirror 2, the reflected light beam is incident to the lens 5b and the refracted light beam from the lens 5b is coupled to the end surface of the optical fiber 1b.

What is necessary is to set the distance between the two optical fibers to "2w", and set the distance between the lens array and the mirror 2 along the optical path to "2w/tan θ" when the angle of the optical axis of the refracted light beam from the lens 5 to the central line of the optical-fiber array is set to "θ".

After reflecting the input light beam from the optical-fiber 1a by the mirror 2 by carrying out like this, in response to the refraction, it is coupled with the end surface of the optical-fiber 1b by the lens 5c. Moreover, the output light beam reflected by the mirror 2 becomes the collimated light beam.

In the composition of FIG. 2B, the positional relationship between the optical fibers and the lenses is the same as in the composition of FIG. 2A. Moreover, the mirror 2a is arranged at right angles to the central line of the four optical fibers at the position where the incident light beam from the optical fiber 1a is refracted by the lens 5a and the refracted light beam crosses the central line of the four optical fibers.

What is necessary is to set the distance between the optical fibers to "2w", and set the distance between the lens array and the mirror 2 along the optical path to "w/tan θ" when the angle of the optical axis of the refracted light beam from the lens 5a to the central line of the optical-fiber array is set to "θ".

The light beam is reflected by the mirror 2a, and the input light beam from the optical fiber 1a is received the refraction by the lens 5a so as to spread on the symmetrical optical path about the central line of the four optical fibers, and it is coupled with the optical fiber 1b in response to the refraction by the lens 5b.

If the optical signals are inputted from the optical fiber 1 and the optical fiber 1a, the optical signals are outputted from the optical fibers 1b and 1c with the composition of FIG. 2A, which serves to perform the function of the 2×2 optical switch. If the optical signal is inputted from the optical-fiber 1a, the optical signal is outputted from the optical-fiber 1b with the composition of FIG. 2B, which serves to perform the function of the 1×1 optical switch. The combination of the input and output ports can be changed with the case of the 2×2 optical switch.

Since the presence of the mirror 2 is unrelated in changing the light beam as in FIG. 2B, it is not necessary to remove the mirror 2 from the optical path.

Although it cannot be used as an optical switch in the add-drop equipment shown in FIG. 9A in composition of having been shown in FIG. 2A, naturally it is possible to change light as in FIG. 1A that it should be used for the add-drop equipment.

The input light from the optical fibers 1 and 1a, and the third mirror may be configured at right angles to the central line of the optical-fiber array at the position which is separated only the focal length of the lens 5 from the lens array.

If the fourth mirror of the size which does not interrupt the light which received the refraction in the position where the light which receives the refraction crosses the central line of the optical-fiber array at the lens 5a with the lens 5 is configured at right angles to the central line of the optical-fiber array.

The input light beam from the optical fiber 1 can be outputted to the optical fiber 1c, and the input light beam from the optical fiber 1a can be outputted to the optical fiber 1b.

What is necessary is to remove the fourth mirror from the optical path and dispose the fifth mirror at the position of the mirror 2 of FIG. 2A, in order to output the light beam from the optical fiber 1 to the optical fiber 1b.

Since the presence of the third mirror is not related at this time, there is no need to remove the third mirror from the optical path as mentioned above.

That is, according to the composition of FIG. 2A, the optical switch can be constituted in any of two or more forms depending on the configuration of the mirrors.

As described above, the 2×2 optical switch can be realized by switching between the composition of FIG. 2A and the composition of FIG. 2B.

According to the composition of FIG. 2A, all the optical fibers are configured about the lens at one side of the optical switch.

Therefore, the optical switch of the embodiment of FIG. 2A is suitable for high-density assembly, and it is possible to provide small-size optical-communication equipment by using the optical switch of the present embodiment.

Figure 3B:
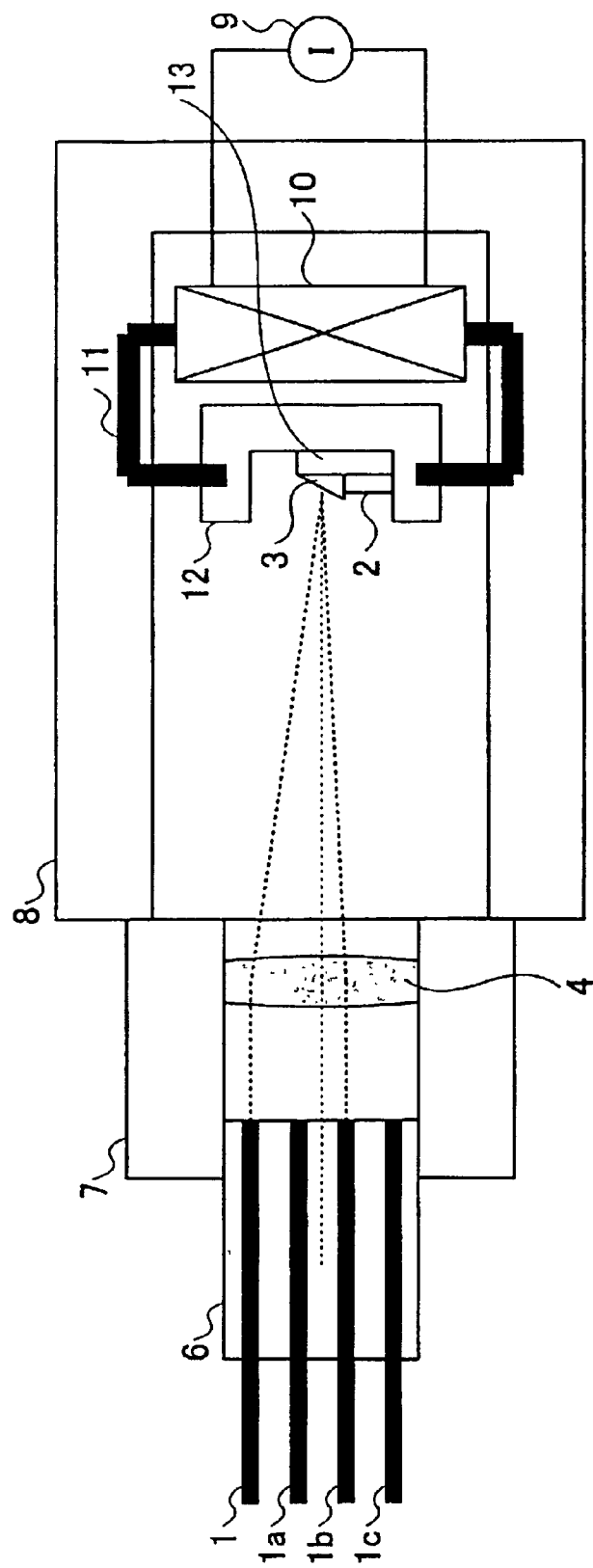

FIG. 3A and FIG. 3B show an optical switch of the first preferred embodiment of the present invention.

In the present embodiment, the optical switch having the composition based on the first aspect of the present invention as in FIG. 1A and FIG. 1B is provided.

Figure 4A:
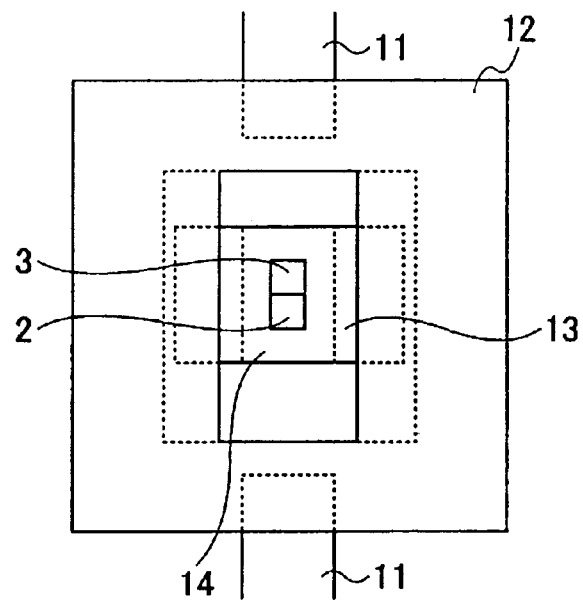
FIG. 4A and FIG. 4B are front and top views of a mirror moving mechanism in the optical switch of the first preferred embodiment.
Figure 4B:
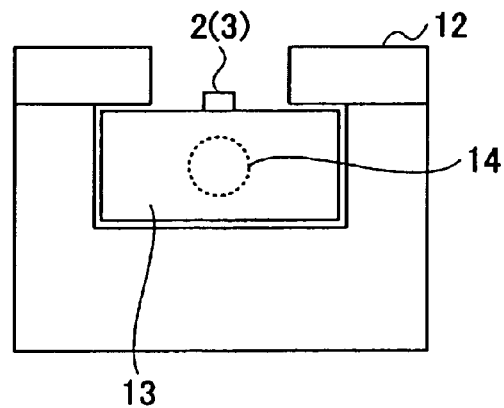

FIG. 4A and FIG. 4B are a front view and a top view of a mirror moving mechanism in the optical switch of FIG. 3A.

In FIG. 3A and FIG. 3B, reference numerals 1, 1a, 1b and 1c are the optical fibers which are arranged at equal intervals and in parallel, reference numeral 6 is the ferrule which fixes the plurality of optical fibers 1–1c, i.e., the optical-fiber array, reference numeral 4 is the collimating lens, reference numeral 7 is the electrode holder which retains the lens 4, and reference numeral 8 is the optical-switch housing.

Moreover, reference numeral 2 is the mirror which has the reflection surface removably disposed perpendicularly on the central line of the optical-fiber array, and reference numeral 3 is the mirror which has the inclined reflection surface removably disposed, with the inclination angle, on the central line of the optical fiber array.

Moreover, reference numeral 9 is the current source, reference numeral 10 is the coil which is driven by the output current of the current source 9, reference numeral 11 is the core which generates the magnetic field in response to the electric current passed through the coil 10 and serves as the electromagnet, reference numeral 12 is the housing, and reference numeral 13 is the movable base which is movably disposed in the housing 12 and fixes both the mirror 2 and the mirror 3 thereto.

The optical-fiber array is fixed to the ferrule 6 by using the adhesive, the ferrule 6 is fixed to the electrode holder 7, and the electrode holder 7 is fixed to the optical-switch housing 8.

The quality of the source materials of the ferrule 6, the electrode holder 7 and the optical-switch housing 8 is not limited to one. However, if such materials are metallic materials, all of the fixed members are suitable for the welding process.

Since the housing 12 will approach the core 11, it is desirable that the housing 12 is not made of a magnetic substance.

The mirror moving mechanism shown in FIG. 3A–FIG. 4B is configured to move selectively one of the mirror 2 and the mirror 3 to the optical path of the light beam from the lens 4.

The permanent magnet 14 is provided in the movable base 13, and the mirror 2 and the mirror 3 are fixed to the surface of the movable base 13.

Since the cross section of the movable base 13 is slightly made small from the cross section of the guide formed of the housing 12 as shown in the upper surface view of FIG. 4B.

The movable base 13 on which the mirror 2 and the mirror 3 are supported can be moved up and down by controlling the magnetic field of the electromagnet which is generated by the core 11.

With the combination of the core 11, the power of absorption of the permanent magnet 14, and rebounding power, transferring the guide to the bottom and stopping can also transfer the guide to the bottom, and it can also be stopped by the movable base 13 on which the mirror 2 and the mirror 3 are supported.

When the mirror 2 is fixed to the bottom for the mirror 3 on the movable base 13 at the bottom and the movable base 13 stops with the up side as in FIG. 3A and FIG. 3B, so that the reflection surface of the mirror 2 may come on the central axis of the lens 4.

The mirror 3 is configured so that the reflection surface of the mirror 3 may come on the central axis of the lens 4 when the movable base 13 stops with the down side.

When the electric current of the positive direction is passed in the coil 10, the reflection surface of the mirror 2 stops on the central axis of the lens 4, and when the electric current of the negative direction is passed in the coil 10, the reflection surface of the mirror 2 stops on the central axis of the lens 4.

In the present embodiment, the respective components of the optical switch are arranged so as to satisfy the following positional relationship.

That is, the optical fibers 1, 1a, 1b and 1c are arranged at equal intervals and in parallel to the central axis of the lens 4. The distance between the end surface of each of the optical fibers 1, 1a, 1b and 1c and the lens 4 is set to be equal to the focal length of the lens 4.

Moreover, the mirror 2 is configured at right angles to the central axis of the lens 4, and it is configured so that the reflection surface of the mirror 2 may be in agreement with the optical-axis crossing of the input light beam from one of the optical fibers 1 and 1a.

For example, if the focal length of the lens 4 is set to 3 mm, the optical fiber 1a is configured in position of 0.125 mm from the central line of the optical-fiber array and the outgoing angle from the lens 4 will configure the optical fiber 1 in position of 0.375 mm from the central line of the optical-fiber array 2.4 degrees, and the outgoing angle from the lens 4 will result in 7.1 degrees.

Therefore, in light of the symmetric property, the position of the optical fiber 1b and the incident angle to the lens 4, and the position of the optical fiber 1c and the incident angle to the lens 4 become −0.375 mm and −7.1 degrees, and −0.125 mm and 2.4 degrees, respectively.

As described above, the optical fibers 1, 1a, 1b and 1c are arranged at equal intervals and in parallel to the central axis of the lens 4. The distance between the end surface of each of the optical fibers 1, 1a, 1b and 1c and the lens 4 is set to the focal length of the lens 4.

And at right angles to the central axis of the lens 4, the mirror 2 is removably disposed at the above-mentioned position on the side opposite to the optical-fiber array side of the lens 4.

On the other hand, when setting the distance "di" between the central axes of the lens 4 and the optical fiber 1b, and the distance "do" between the central axes of the lens 4 and the optical fiber 1, and setting the focal length of the lens 4 to "f", the inclination angle of the reflection surface of the mirror 3 from the central axis of the lens 4 is determined as being $[90 \text{ degrees} + (\tan^{-1}(di/f) - \tan^{-1}(do/f))/2]$. The mirror 3 is removably disposed at the above-mentioned position on the side opposite to the optical-fiber array side of the lens 4.

For example, when it is set so as to satisfy the positional relationship, the inclination angle of the reflection surface of the mirror 3 is equal to, for example, the angle of +2.4 degrees plus 90 degrees from the central axis of the lens 4.

Therefore, if the mirror 2 is disposed on the central axis of the lens 4 and light is inputted from the optical fibers 1 and 1a similar to FIG. 3A, it will bond with the optical fibers 1c and 1b, and output light will serve as the optical switch of the two output in the two input.

If the mirror 3 is disposed on the central axis of the lens 4 and the light of the optical fiber 1 is inputted as in FIG. 3B, it couples with the optical fiber 1b. This composition yields in the optical switch applicable to the add-drop equipment shown in FIG. 9A and FIG. 9B.

As described above, according to the present embodiment, the 2×2 optical switch can be realized by switching between the composition of FIG. 3A and the composition of FIG. 3B.

Moreover, all the optical fibers including the input fibers and the output fibers are arranged on a single side of the optical switch. Therefore, the optical switch of the present embodiment is suitable for high-density assembly, and it is possible to provide small-size optical-communication equipment by using the optical switch of the present embodiment.

In the above-mentioned embodiment, the mirror moving mechanism of the magnetic-field driving method has been described. Alternatively, the mirror moving mechanism of the electrostatic driving method may be used instead. Since the composition of the mirror moving mechanism of the electrostatic driving method is essentially the same as that of the mirror moving mechanism of the magnetic-field driving method, a description thereof will be omitted.

Figure 5A:
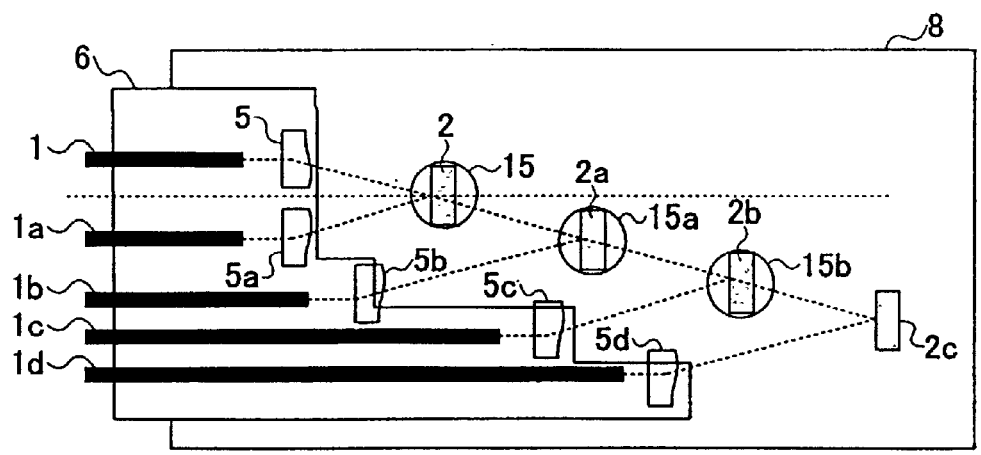
FIG. 5A and FIG. 5B are diagrams of the optical switch according to the second preferred embodiment of the present invention.
Figure 5B:
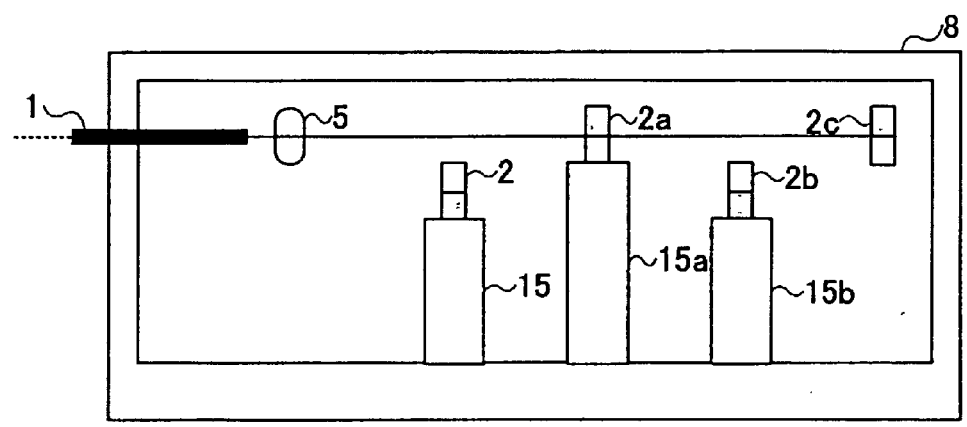

FIG. 5A and FIG. 5B show an optical switch of the second preferred embodiment of the present invention.

Specifically, the optical switch having the composition of 1 input by four outputs based on the second aspect of the present invention is provided. FIG. 5A is a top view of the optical switch of the present embodiment and FIG. 5B is a side view of the optical switch of the present embodiment. However, in the configuration of FIG. 6B, the configuration of the mirrors is mainly illustrated, and all the components of the optical switch are not illustrated.

In FIG. 5A and FIG. 5B, reference numerals 1 through 1d are the optical fibers. In the present example, the optical fiber 1 is the input port and the optical fibers 1a–1d are the output ports. Reference numerals 2 through 2c are the mirrors, reference numerals 5 through 5d are the lenses, reference numeral 6 is the ferrule, and reference numerals 15 through 15b are the mirror moving mechanism to which the mirrors 2–2b are fixed. The mirrors 2–2b are moved up and down with the mirror moving mechanisms 15–15b respectively. Reference numeral 8 is the optical-switch housing.

Only the mirror 2c is fixed to the optical-switch housing 8 without being fixed to the mirror moving mechanism.

Specifically, in the present embodiment, the respective components of the optical switch are arranged so as to satisfy the following positional relationship.

The optical fibers and the lens array are arranged so that the distances between the end surfaces of the optical fibers and the lenses of the lens array are respectively equal to the focal length of the lens array.

The central axis of the optical fiber 1 is arranged in parallel to the central axis of the lens 5, and shifted by a predetermined distance d from the central axis of the lens 5. Similarly, the central axis of the optical fiber 1a is arranged in parallel to the central axis of the lens 5a, and shifted by the predetermined distance d from the central axis of the lens 5a.

Similarly, the central axis of the optical fiber 1b is arranged in parallel to the central axis of the lens 5b, and shifted by the predetermined distance d from the central axis of the lens 5b. The central axis of the optical fiber 1c is arranged in parallel to the central axis of the lens 5c, and shifted by the predetermined distance d from the central axis of the lens 5c.

Similarly, the central axis of the optical fiber 1d is arranged in parallel to the central axis of the lens 5d, and shifted by the predetermined distance d from the central axis of the lens 5d.

If the gap of the central axes of the optical fiber 1 and the lens 5 is positive, then the respective gaps of the central axes of the optical-fiber 1a and the lens 5a, the optical fiber 1b and the lens 5b, the optical fiber 1c and the lens 5c, and the optical fiber 1d and the lens 5d are negative. That is, the latter is shifted to the opposite direction.

If the central axis of the optical fiber and the central axis of the lens are shifted, the reflection surface of the mirror is configured at right angles to the central axis of the optical fiber like the above, it will be reflected by the mirror and the input light will return, incidence of the light refracted with the lens will be carried out to the optical fiber which is surely the pair.

For example, as shown in FIG. 5B, when the mirror 2a is disposed in the optical path of input light, after the light inputted from the optical fiber 1 is refracted with the lens 5, it is reflected by the mirror 2a, and it is refracted by the lens 5b, and is coupled with the optical fiber 1b.

When the mirror 2a is removed from the optical path and the mirror 2b is disposed in the optical path, after the light inputted from the optical fiber 1 is refracted with the lens 5, it is reflected by the mirror 2b, and it is refracted by lens 5c, and is coupled with the optical fiber 1c.

Thus, the output port of the light inputted from the optical fiber 1 can be arbitrarily chosen by which mirror is disposed among the plurality of mirrors which can be disposed in the optical path.

According to the composition of FIG. 5A, all the optical fibers including the input fibers and the output fibers are arranged on a single side of the optical switch. Therefore, the optical switch of the present embodiment is suitable for high-density assembly, and it is possible to provide small-size optical-communication equipment by using the optical switch of the present embodiment.

With the composition of FIG. 5A, the end surfaces of the optical fibers and the positions of the lenses are changed in the propagation direction of the input light, and it differs from the composition shown in FIG. 2A.

From the end surfaces of the optical fibers in the near positions, and the positions of the lenses, the end surfaces of the optical fibers which are specifically in the distant positions to the central line between the optical fiber 1 used as the input port and the optical fiber 1a used as the output port near the optical fiber 1, and the positions of the lenses are moved forward in the propagation direction of the input light.

The purpose of the above composition is to make the difference of the propagation length as small as possible and reduce the difference of the propagation loss. Generally, when light spreads space, the difference of the propagation loss will arise by the optical path if the difference of the propagation length by the optical path is large.

In the composition of FIG. 5A, the shortest propagation length is the case where the light beam inputted from the optical fiber 1 is outputted from the optical fiber 1a. The shortest propagation length is twice the distance from the lens 5 to the mirror 2. The longest propagation length is the case where the light beam inputted from the optical fiber 1 is outputted from the optical fiber 1d. The longest propagation length is the sum of the distance from the lens 5 to the mirror 2c and the distance from the mirror 2c to the lens. Thus, the difference of the propagation length is equal to the distance from the mirror 2 to the mirror 2c.

Therefore, the difference of the propagation length is equivalent to the distance from the mirror 2 to the mirror 2c.

On the other hand, when the positions of all the lenses are the same in the direction of the optical path, the longest propagation length is twice the distance from the lens 5 to the mirror 2c. The difference with the shortest propagation length is twice the distance from the mirror 2 to the mirror 2c.

If the position of the lens is changed in the direction of the optical path of the light beam as in FIG. 5A, the difference of the propagation length by the optical path can be reduced, and the difference of the propagation loss by the optical path can be reduced.

In the above-mentioned embodiment, the optical-switch housing can be made smaller than in the case where all the positions of the end surfaces of the plurality of optical fibers are arranged in agreement. This is because the position shown in FIG. 5A is adequate. In the case where all the positions of the end surfaces of the plurality of optical fibers are arranged in agreement, the necessity of moving the lens 5d and the optical fiber 1d further downward arises, in order to refract the light beam reflected by the mirror 2c by the lens 5d, and couples the refracted light beam with the optical fiber 1d.

Therefore, according to the above embodiment, it is possible to provide a smaller-size optical switch.

In the above embodiment of FIG. 5A, the respective intervals of the optical fibers are not the same. This is the result of changing the end surfaces of the optical fibers and the positions of the lenses in the propagation direction of the incoming light beam. Although, in the composition of FIG. 2A, the respective intervals of the optical fibers are the same, it is not necessary that the respective intervals of the optical fibers in the optical switch of the second preferred embodiment are the same.

Figure 6A:
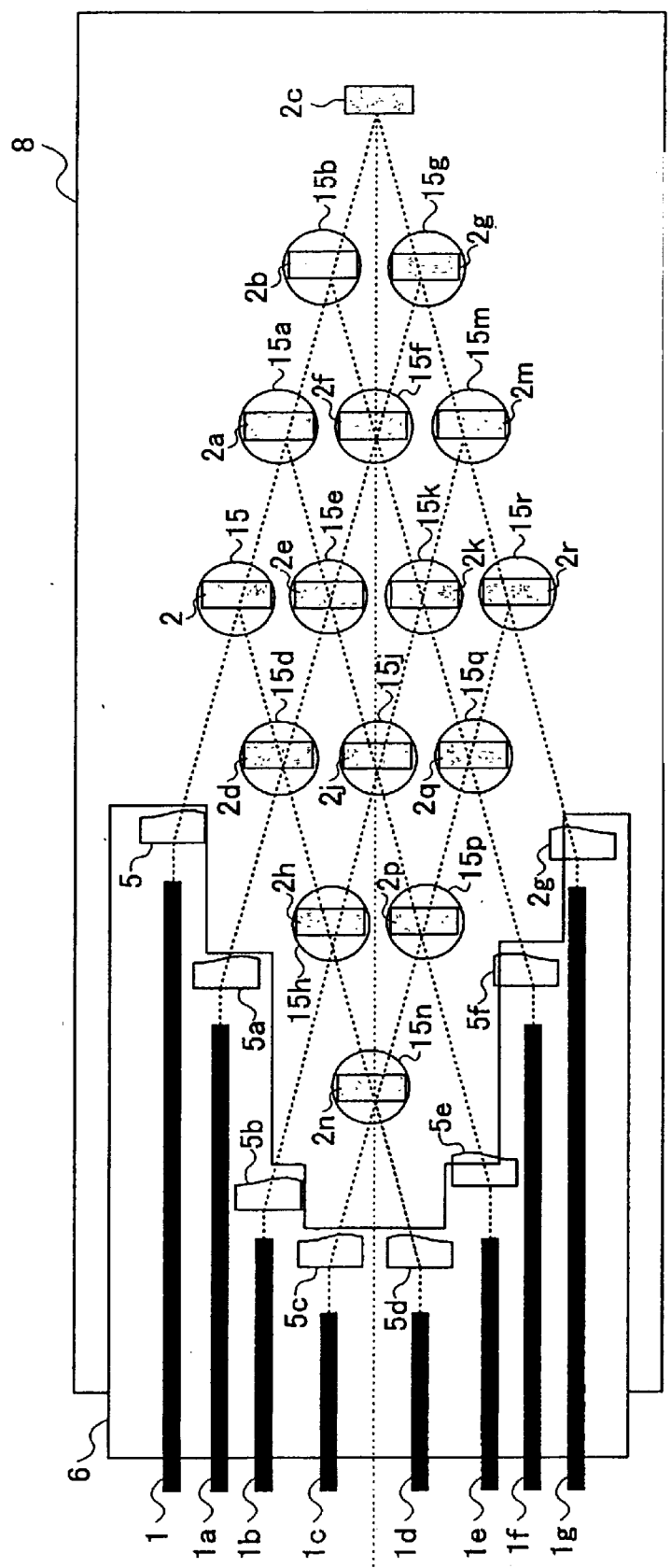
FIG. 6A and FIG. 6B are diagrams showing a variation of the optical switch of the second preferred embodiment.
Figure 6B:
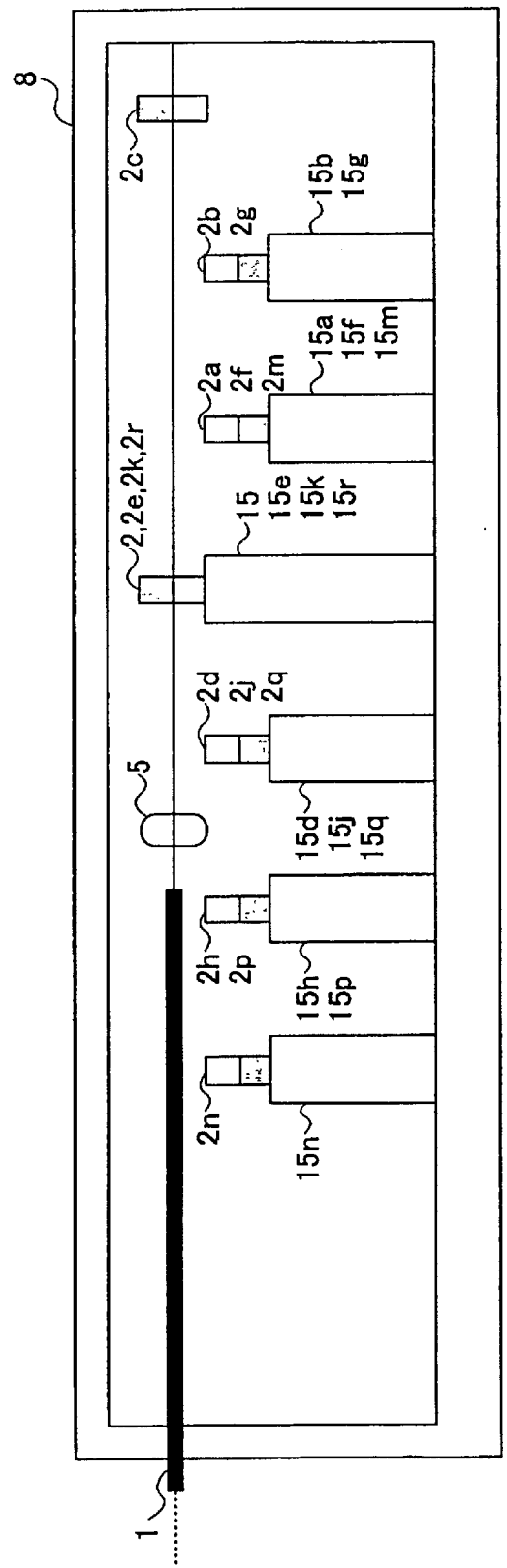

FIG. 6A and FIG. 6B show a variation of the optical switch of the second preferred embodiment.

In the embodiment of FIG. 6A, the optical switch of the present invention having the composition of 4 inputs by 4 outputs according to the second aspect of FIG. 2A and FIG. 2B is provided. FIG. 6A is a top view of the optical switch of the present embodiment and FIG. 6B is a side view of the optical switch of the present embodiment. However, in the configuration of FIG. 6B, the configuration of the mirrors is mainly illustrated, and all the components of the optical switch are not illustrated.

In FIG. 6A and FIG. 6B, reference numerals 1 through 1g are the optical fibers. In this example, the optical fibers include the input fibers 1–1c and the output fibers 1d–1g. Reference numerals 2 through 2r are the lenses, reference numeral 6 is the ferrule, and reference numerals 15–15b and 15d–15r are the mirror moving mechanisms to which the mirrors (excluding the mirror 2c) are fixed. Each of the mirror moving mechanisms 15–15r serves to move the related mirror up and down with respect to the optical path of the related light beam. Reference numeral 8 is the optical-switch housing. Only the mirror 2c is fixed to the optical-switch housing 8 and cannot be moved, and the other mirrors 2–2b and 2d–2r are movable with the respective mirror moving mechanisms 15–15b and 15d–15r.

The relationship of each component of the optical switch has been explained with reference to FIG. 2A and FIG. 5A, and duplicate description thereof will be omitted.

For example, when the mirrors 2, 2e, 2k and 2r are disposed in the optical paths of the incoming light beams respectively as shown in FIG. 6B, the incoming light beam from the optical fiber 1 is refracted by the lens 5, it is reflected by the mirror 2, and it is again refracted by the lens 5d, so that the refracted light beam is coupled with the optical fiber 1d.

Similarly, in the above-mentioned condition, the incoming light beam from the optical fiber 1a is refracted by the lens 5a, it is reflected by the mirror 2e, and it is again refracted by the lens 5e, so that the refracted light beam is coupled with the optical fiber 1e. The incoming light beam from the optical fiber 1b is refracted by the lens 5b, it is reflected by the mirror 2k, and it is again refracted by the lens 5f, so that the refracted light beam is coupled with the optical fiber 1f. The incoming light beam from the optical fiber 1c is refracted by the lens 5c, it is reflected by the mirror 2r, and it is again refracted by the lens 5g, so that the refracted light beam is coupled with the optical fiber 1g.

Unlike the above condition, when the mirrors 2, 2a, 2b, 2d, 2e, 2g, 2h, 2k, 2m, 2p, 2q and 2r are removed from the respective optical paths and only the mirrors 2f, 2j and 2n are disposed in the respective optical paths (the position of the mirror 2c is always fixed and therefore disposed in the optical path), the light beam from the optical fiber 1 is finally coupled with the optical fiber 1g, the light beam from the optical fiber 1a is finally coupled with the optical fiber 1f, the light beam from the optical fiber 1b is finally coupled with the optical fiber 1e, and the light beam from the optical fiber 1c is finally coupled with the optical fiber 1d.

Accordingly, the output port of the outgoing light beam corresponding to the light beam inputted into each input port can be arbitrarily chosen depending on which one of the mirrors is actually disposed is disposed in the optical path of the light beam.

According to the optical switch of FIG. 6A and FIG. 6B, all the optical fibers including the input fibers and the output fibers are arranged on a single side of the optical switch. Therefore, the optical switch of the present embodiment is suitable for high-density assembly, and it is possible to provide a small-size optical-communication equipment by using the optical switch of the present embodiment.

Moreover, in the composition of FIG. 6A, the end surfaces of the outer optical fibers and the positions of the outer lenses are shifted from the end surfaces of the inner optical fibers and the positions of the inner lenses in the propagation direction of input light and the respective intervals of the optical fibers are not the same. The reason for this composition is the same as that mentioned above with respect to the composition of FIG. 5A.

However, the situation of the composition of FIG. 6A differs a little from that of the composition of FIG. 5A. The composition of FIG. 5A includes one input fiber and four output fibers and it is the unsymmetrical configuration. Unlike this, the composition of FIG. 6A includes four input fibers and four output fibers and it is the symmetrical configuration. That is, in the composition of FIG. 6A, the outer optical fibers among the optical fibers used as the input ports have the end surfaces that are individually deviated toward the far-end side of the optical switch, while the outer optical fibers among the optical fibers used as the output ports have the end surfaces that are individually deviated toward the far-end side of the optical switch. This matter is also applicable with respect to the composition of FIG. 5A.

Concerning the above embodiments of FIG. 5A through FIG. 6B, the relationship between the mirror and the mirror moving mechanism will now be described.

Figure 7:
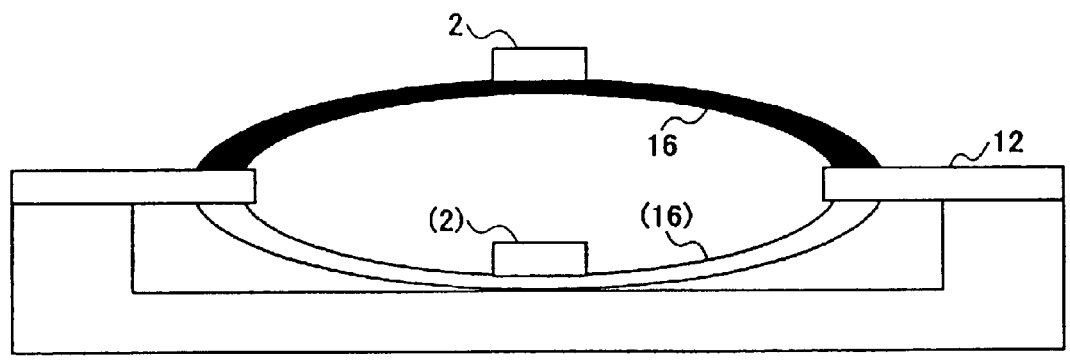
FIG. 7 is a diagram of a mirror moving mechanism in the optical switch of the second preferred embodiment.

FIG. 7 shows a mirror moving mechanism in the optical switch of the second preferred embodiment.

In the mirror moving mechanism of FIG. 7, reference numeral 2 is the mirror, reference numeral 16 is the bimetal, and reference numeral 12 is the housing of the moving mechanism.

In the present embodiment, the mirror moving mechanism uses the control unit (not shown) which controls the supply of electric current to the bimetal 16. The controlling of the supply of electric current to the bimetal is well known in the art, and the illustration of the control unit is omitted.

The bimetal 16, which is indicated as the black area in FIG. 7, is in the state in which it is curved upward as a result of the supply of electric current. The bimetal (16), which is indicated as the white area in FIG. 7, is in the state in which it is curved downward as a result of the non-supply of electric current.

As the mirror 2 is fixed onto the top of the bimetal 16, the mirror 2 is removably disposed in the optical path of the light beam in the optical switch of FIG. 5A or FIG. 6A. When the bimetal 16 is curved upward, the mirror 2 is placed in the optical path of the light beam. When the bimetal 16 is curved downward, the mirror 2 is removed from the optical path of the light beam.

As shown in FIG. 7, the mirror 2 is fixed to the moving part (the bimetal 16) of the mirror moving mechanism. When one of the plurality of mirrors is needed to be chosen and disposed into the optical path in the optical switch of FIG. 5A or FIG. 6A, it is possible to ensure that the optical path of the light beam which should be reflected by the related lens is not influenced or interrupted by the other mirrors because of the use of the mirror moving mechanism of the present embodiment.

In the above-described embodiment of FIG. 7, the bimetal is used as a moving part to which the mirror is fixed, and the bimetal is curved upward or downward as a result of the electric current control. Alternatively, the mirror may be fixed to a laminated ceramic member having ceramic materials with different piezoelectric coefficients. Such mirror moving mechanism may be actuated upward or downward as a result of electric voltage control. Moreover, alternatively, the mirror may be fixed to a diaphragm which may be actuated upward or downward as a result of gaseous pressure control.

In the above embodiments of FIG. 2A, FIG. 5A and FIG. 6A, the central axis of the optical fiber and the central axis of the lens are shifted by a predetermined distance so that the incident light beam is refracted by the lens. However, the present invention is not limited to such embodiments.

Figure 8:
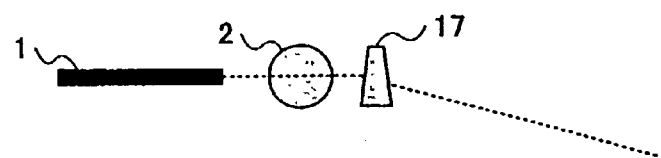
FIG. 8 is a diagram of a refraction unit in the optical switch of FIG. 2A and FIG. 2B.

FIG. 8 shows a refraction unit for use in the optical switch in the composition of FIG. 2A.

In FIG. 8, reference numeral 1 is the optical fiber, reference numeral 2 is the lens, and reference numeral 17 is the wedge-shaped prism as the refraction unit.

Unlike the composition of FIG. 2A, the central axis of the optical fiber 1 and the central axis of the lens 2 are made in agreement, and the wedge-shaped prism 17 serves to refract the light beam passing through the lens 2.

Although the number of the optical parts needed for this composition is increased, what is necessary is to configure the optical fiber 1, the lens 2 and the wedge-shaped prism 17 on the straight line. According to this embodiment, the fixation of the optical fiber 1, the lens 2, and the wedge-shaped prism 17 can be easily performed.

Moreover, in the above embodiments of FIG. 2A, FIG. 5A and FIG. 6A, it is assumed that the mirror being used in the optical switch has the plane reflection surface. However, the present invention is not limited to such embodiments.

According to the original properties of light, when the light spreads space, the light beam will spread when the propagation distance becomes long. Thus, when the incident light beam is reflected by the plane mirror, the reflected light beam will spread further, and the loss of the optical energy of the reflected light will be increased.

In order to avoid this, the concave mirror may be used instead the plane mirror. The use of the concave mirror allows the light beam reflected by the mirror to be changed to the convergent light beam, and allows the loss of the optical energy to be reduced. In this embodiment, since the width of the light beam changes with the distance from the lens or wedge-shaped prism (which refracts the incident light beam) to the mirror, it is necessary to dispose the concave mirror having the curvature varied depending on to the distance from the lens or wedge-shaped prism to the mirror.

The present invention is not limited to the above-described embodiments, and variations and modifications may be made without departing from the scope of the present invention.

Further, the present invention is based on Japanese priority application No. 2002-071164, filed on Mar. 15, 2002, the entire contents of which are hereby incorporated by reference.

What is claimed is:

1. An optical switch comprising:

a plurality of optical fibers, including input fibers and output fibers, arrayed at equal intervals and in parallel, each of the plurality of optical fibers having a central axis and having an end surface on one side of the optical switch;

a single lens having a focal length and a central axis, the central axis of the lens being parallel to the central axis of each optical fiber, the lens disposed away from the end surface of each optical fiber at a distance corresponding to the focal length of the lens;

a first mirror having a first reflection surface perpendicular to the central axis of the lens, the first mirror removably disposed at a first position on the other side of the optical switch; and a second mirror having a second reflection surface inclined from the central axis of the lens, the second mirror removably disposed at the first position, wherein the first and second mirrors are configured such that one of the first and second mirrors is selectively disposed at the first position.

2. An optical switch comprising:

a plurality of optical fibers, including input fibers and output fibers, arrayed in parallel, each of the plurality of optical fibers having a central axis and having an end surface on one side of the optical switch;

a plurality of lenses, each having a focal length and a central axis, respectively provided for the plurality of optical fibers, the central axis of each lens being arranged in parallel to and shifted by a predetermined distance from the central axis of each optical fiber, each lens disposed away from the end surface of a corresponding one of the plurality of optical fibers at a distance corresponding to the focal length of the lens; and a plurality of mirrors each having a reflection surface perpendicular to a central axis between one of the input fibers and one of the output fibers, each of the plurality of mirrors, excluding a mirror located on a far-end side of the optical switch in a propagation direction of light, being removably disposed at a crossing-point position corresponding to a position where an optical axis of a light beam from one of the input fibers and an optical axis of a light beam to one of the output fibers cross each other, wherein the plurality of mirrors are configured such that one of the plurality of mirrors is selectively disposed at the crossing-point position.

3. An optical switch of claim 1, further comprising a movable base on which a single lens is supported, the movable base being moved perpendicularly to the central axis of the lens by using either electrostatic force or magnetic force, so that one of the first and second mirrors is selectively disposed at the first position.

4. An optical switch of claim 1, wherein an inclination angle of the second reflection surface of the second mirror from the central axis of the lens is represented by $[90 \text{ degrees} + \{\tan^{-1}(d_i/f) - \tan^{-1}(d_o/f)\}/2]$ where $d_i$ is a distance between the central axes of the lens and one of the input fibers, $d_o$ is a distance between the central axes of the lens and one of the output fibers, and $f$ is the focal length of the lens.

5. An optical switch of claim 1, wherein the first distance between the lens and one of the first mirror and the second mirror is represented by $(d/\tan \theta)$ where $d$ is a distance between the central axis of one of the plurality of optical fibers and the central axis of the lens, and $\theta$ is an angle between an optical axis of a refracted light beam from the lens and the central line of the lens.

6. An optical switch of claim 2, further comprising a movable base on which one of the plurality of mirrors is supported, the movable base being moved perpendicularly to the central axis of a corresponding one of the plurality of lenses by using any of thermal expansion, piezoelectric expansion and gaseous pressure expansion, so that one of the plurality of mirrors is selectively disposed at the crossing-point position.

7. An optical switch of claim 2, wherein the plurality of optical fibers and the plurality of lenses are configured so that outer ones of the optical fibers have the end surfaces that are individually deviated from inners ones of the optical fibers toward the other side of the optical switch, and outer ones of the lenses have positions that are individually deviated from inner ones of the lenses toward the other side of the optical switch.

8. An optical switch of claim 2, wherein each of the plurality of mirrors is configured into a concave mirror having a concave reflection surface, the reflection surface of each mirror having a curvature varied depending on a distance between a corresponding one of the plurality of lenses and the mirror.

9. An optical switch of claim 2, further comprising a plurality of wedge-shaped prisms respectively provided for the plurality of lenses, wherein the central axis of each of the plurality of optical fibers and the central axis of a corresponding one of the plurality of lenses are in agreement, and a light beam from one of the plurality of lenses is refracted by using a corresponding one of the plurality of wedge-shaped prisms.

10. An optical switch of claim 2, wherein the mirror located on the far-end side of the optical switch is only fixed among the plurality of mirrors, and the reflection surface of the fixed mirror is disposed at the crossing-point position where an optical axis of a light beam from an outermost one of the input fibers and an optical axis of a light beam to an outermost one of the output fibers cross each other.

* * * * *

UNITED STATES PATENT AND TRADEMARK OFFICE
CERTIFICATE OF CORRECTION

PATENT NO. : 6,829,403 B2
DATED : December 7, 2004
INVENTOR(S) : Norihisa Naganuma It is certified that error appears in the above-identified patent and that said Letters Patent is hereby corrected as shown below:

Title page,
Item [54], Title, correct from "OPTICAL SWITCH HAVING AN ARRAY OF OPTICAL FIBERS WITH RESPECTIVE, REMOVBLE DISPOSED MIRRORS AND A LENS DISPOSED AWAY FROM AN END SURFACE OF EACH CORRESPONDING OPTICAL FIBER" to -- OPTICAL SWITCH HAVING AN ARRAY OF OPTICAL FIBERS WITH RESPECTIVE, REMOVBLY DISPOSED MIRRORS AND A LENS DISPOSED AWAY FROM AN END SURFACE OF EACH CORRESPONDING OPTICAL FIBER --

Column 20,
Line 10, change "inners" to -- inner --.

Signed and Sealed this

Seventh Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,829,403 B2  Page 1 of 1
APPLICATION NO. : 10/290501
DATED : December 7, 2004
INVENTOR(S) : Norihisa Naganuma It is certified that error appears in the above-identified patent and that said Letters Patent is hereby corrected as shown below:

Title page,
Item [54], Title, correct from "OPTICAL SWITCH HAVING AN ARRAY OF OPTICAL FIBERS WITH RESPECTIVE, REMOVABLE DISPOSED MIRRORS AND A LENS DISPOSED AWAY FROM AN END SURFACE OF EACH CORRESPONDING OPTICAL FIBER" to -- OPTICAL SWITCH HAVING AN ARRAY OF OPTICAL FIBERS WITH RESPECTIVE, REMOVABLY DISPOSED MIRRORS AND A LENS DISPOSED AWAY FROM AN END SURFACE OF EACH CORRESPONDING OPTICAL FIBER --

Column 20,
Line 10, change "inners" to -- inner --.

This certificate supersedes the Certificate of Correction issued June 7, 2005.

Signed and Sealed this

Tenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.         : 6,829,403 B2
APPLICATION NO. : 10/290501
DATED              : December 7, 2004
INVENTOR(S)       : Norihisa Naganuma It is certified that error appears in the above-identified patent and that said Letters Patent is hereby corrected as shown below:

Title page,
Item [54] and Column 1, lines 1-6, Title, correct from "OPTICAL SWITCH HAVING AN ARRAY OF OPTICAL FIBERS WITH RESPECTIVE, REMOVABLE DISPOSED MIRRORS AND A LENS DISPOSED AWAY FROM AN END SURFACE OF EACH CORRESPONDING OPTICAL FIBER" to -- OPTICAL SWITCH HAVING AN ARRAY OF OPTICAL FIBERS WITH RESPECTIVE, REMOVABLY DISPOSED MIRRORS AND A LENS DISPOSED AWAY FROM AN END SURFACE OF EACH CORRESPONDING OPTICAL FIBER --

Column 20,
Line 10, change "inners" to -- inner --

This certificate supersedes the Certificates of Correction issued June 7, 2005 and March 10, 2009.

Signed and Sealed this

Thirty-first Day of March, 2009

JOHN DOLL
*Acting Director of the United States Patent and Trademark Office*